Sept. 8, 1931.  K. ICHIJYO  1,821,971
FRUIT CUTTING KNIFE
Filed Oct. 19, 1928
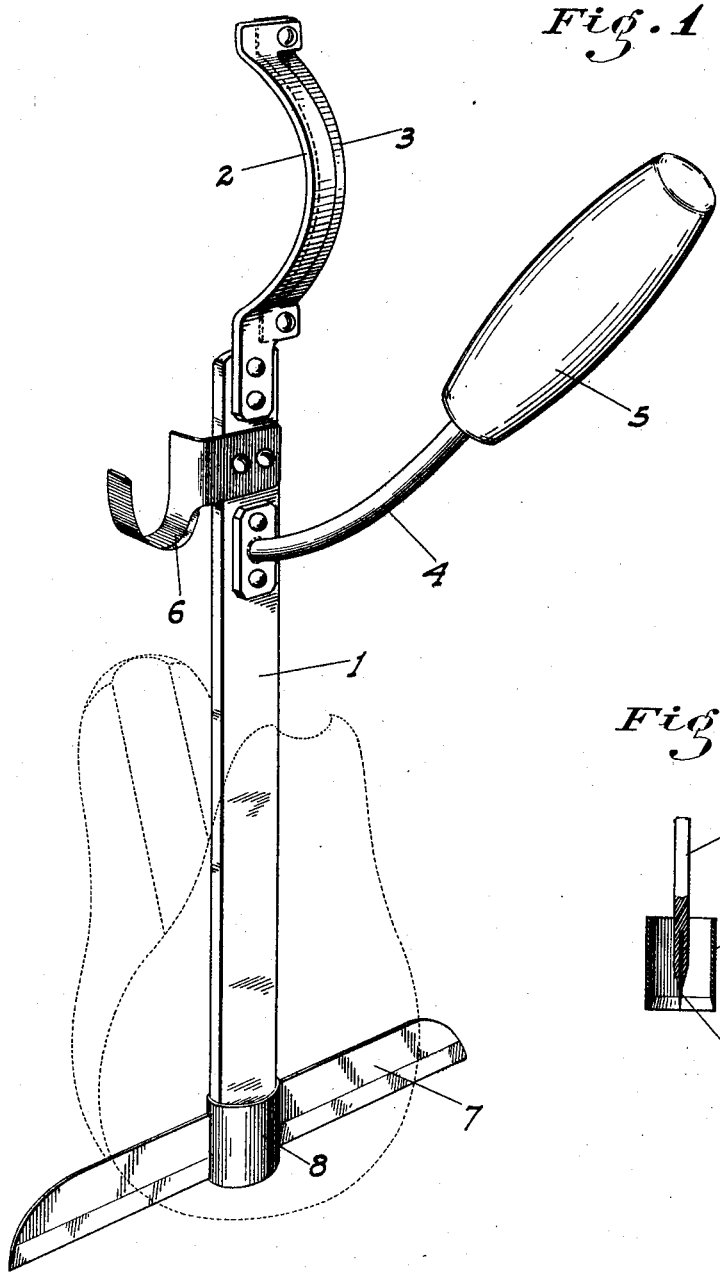
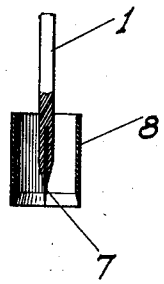
INVENTOR
K. Ichijyo
BY
ATTORNEY Patented Sept. 8, 1931

1,821,971

UNITED STATES PATENT OFFICE

KURANOSUKE ICHIJYO, OF SACRAMENTO, CALIFORNIA

FRUIT CUTTING KNIFE

Application filed October 19, 1928. Serial No. 313,498.

This invention relates to hand cutting tools for use with fruit, and particularly to one for the use of cannery operators working on fresh fruits, and especially pears.

The principal object of my invention is to provide as a single unit a tool by means of which the fruit may be peeled, any surface imperfections or soft spots may be gouged out, and the fruit then cut lengthwise in half. At the same time in connection with this last operation the stem and at least the greater portion of the core are also simultaneously removed.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claim.

In the drawings similar characters of reference indicate corresponding parts in the several views:

Fig. 1 is a perspective view of my improved implement.

Fig. 2 is a cross section of the tool at its lower end showing the fruit halving and coring elements.

Referring now more particularly to the characters of reference on the drawings the numeral 1 denote a straight rigid shank, preferably of rectangular and relatively flat cross section; and whose length is considerably greater than the length of the fruit to be worked on. Secured on and projecting upwardly from the top of the shank is a paring or peeling device which is substantially of the same form as the potato paring knives now on the market, but having a greater curvature of blade. This knife consists essentially of a rigid curved supporting bar 2 and a blade 3 extending between and secured to the ends of the bar on its inside or concave face. The blade is of somewhat flatter curvature than the bar so that a space between the blade and bar is formed for the passage of the peelings. The cutting edge of the blade as usual is disposed in a transverse plane intermediate the edges of the bar.

Secured to and projecting upwardly and laterally from the shank a short distance below the paring device, and disposed on the side of the shank from which the convex face of the bar projects is a stem 4 on the outer end of which a handle 5 is secured.

Removably secured to the shank between the stem 4 and the adjacent end of the bar 2 is a hook-like gouging tool 6. This tool is disposed to one side of the plane of the stem 4 and the paring knife and its cutting edge is convex relative to said knife and is parallel to and adjacent the face of the shank from which the stem projects. This tool as above stated is removably secured in place so that it may be reversed in position if desired or when necessary, or left off entirely, according to the character of fruit being worked on.

On the lower end of the shank is secured a horizontal and straight cutting blade 7 whose cutting edge faces down and extends equal distances on each side of the shank. Surrounding the blade and shank in the plane of the blade is a circular or tubular cutting element 8, which is also sharpened on its lower edge as shown in Fig. 2, and which edge is preferably in the same horizontal plane as the cutting edge of the blade 7.

In operation to peel the fruit or remove imperfections the shank is grasped by one hand of the operator with the stem 4 facing toward him and preferably engaged by the index finger. The stem then forms a steadying means preventing turning or slipping of the shank in the hand. The paring and gouging members are then in a convenient position to operate on the fruit held in the other hand. When these operations are completed the operator holds the fruit upright on his work table and grasps the tool by the handle 5 only. He then engages the upper end of the fruit with the blade 7 and presses down on the handle so that the fruit is cut into two halves as indicated. The length of the shank from the bottom of the blade 7 to the stem 4 is sufficiently greater than the length of the fruit so that there is no danger of the stem coming in contact and damaging the fruit when the blade 7 is thus pressed through the same from end to end. At the same time the circular cutting element 8 also engages the fruit and on account of its shape causes the stem and core portions to be cut out on each side of the line of cut or cleavage of the blade 7; the core pieces thus removed passing through the spaces formed between the circular cutting element and the flat shank.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described my invention what I claim as new and useful and desire to secure by Letters Patent is:

A fruit cutting knife comprising a rigid shank straight from end to end, of a cutting blade extending transversely of the shank on one end of the same, another cutting blade projecting as a longitudinal extension of the shank from the opposite end of the same, a stem secured to and projecting laterally from the shank in a plane at right angles to the plane of the transverse blade and disposed toward the end on which said second blade is mounted and in acute angular relation to the shank at said end; and a handle on the outer end of the stem and forming a longitudinal extension thereof; the length of the shank between its connection with the handle and the transverse blade being sufficient to enable said shank to serve as a handle for the operation of the other cutting blade.

In testimony whereof I affix my signature.

KURANOSUKE ICHIJYO.